Patented Aug. 1, 1939

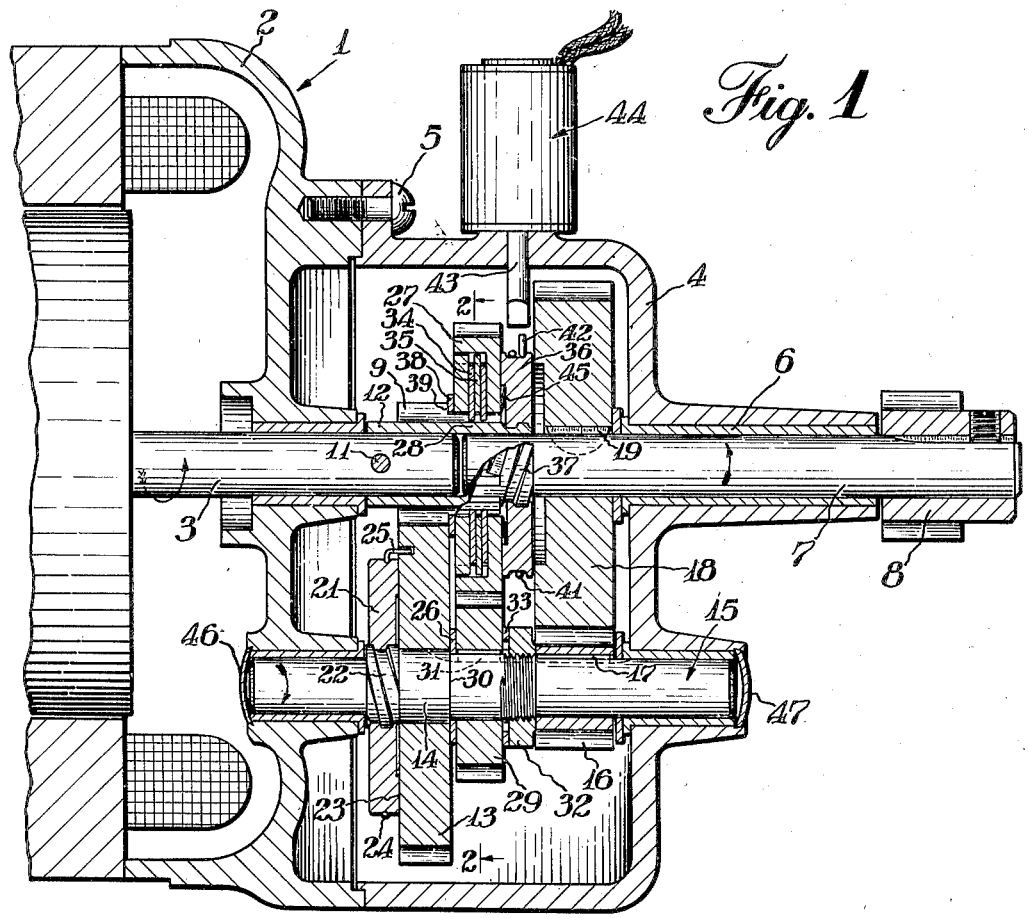

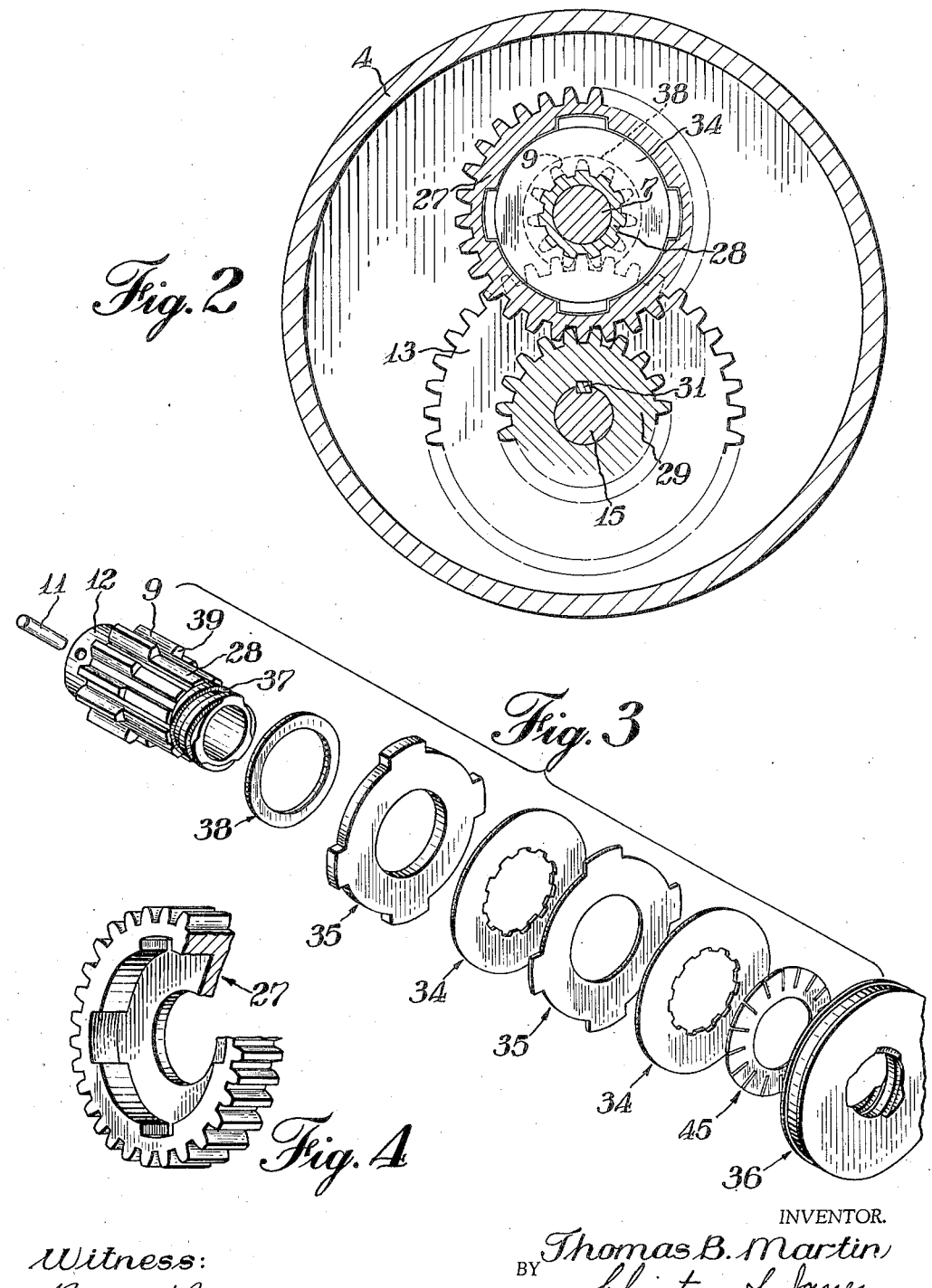

2,167,846

UNITED STATES PATENT OFFICE

2,167,846

VARIABLE SPEED GEARING

Thomas B. Martin, Horseheads, N. Y., assignor, by mesne assignments, to Bendix Aviation Corporation, South Bend, Ind., a corporation of Delaware Application January 15, 1937, Serial No. 120,700

8 Claims. (Cl. 74—368)

The present invention relates to variable speed gearing and more particularly to reduction gearing capable of operating selectively at two different speed ratios, and to certain novel forms of transmission devices incorporated therein.

A divisional application Serial Number 278,531 was filed on June 10, 1939, for the purpose of obtaining protection in respect to the novel clutch mechanism disclosed in this application.

In connection with the automatic or semi-automatic actuation from a single power source of machinery and especially light machinery such as domestic washing machines in which there are a plurality of stages of operation at different speeds, it is desirable to provide a variable speed gearing and controlling means therefor which are readily adaptable to such automatic or semi-automatic operation.

It is an object of the present invention to provide a novel variable speed gearing which is efficient and reliable in operation and which is easily controlled in a simple and positive manner by automatic or semi-automatic means.

It is another object to provide such a device which normally operates at low speed in which when the high speed gearing is rendered operative, the low speed gearing automatically releases, and when the high speed gearing is rendered inoperative, the low speed gearing automatically resumes operation.

It is a further object to provide such a device in which the transmission gears are in mesh at all times.

It is another object to provide a transmission mechanism including a novel form of self-tightening clutch.

It is another object to provide such a transmission including a novel clutch in which the self-tightening action of the clutch may be automatically or semi-automatically controlled.

It is another object to provide a variable speed transmission including self-tightening clutches for the high speed and low speed gear trains which are adapted to engage without shock, drive without slip, and release without sticking.

It is another object to provide such a device in which the engagement of the high speed clutch is maintained by controlling means which, when released, permits the high speed clutch to release, whereupon the low speed clutch automatically engages.

Further objects and advantages will be apparent from the following description taken in connection with the accompanying drawings in which:

Fig. 1 is a vertical substantially mid-sectional view of a preferred form of the present invention;

Fig. 2 is a section taken substantially on the line 2—2 of Fig. 1;

Fig. 3 is a detail in perspective showing the parts of the high speed clutch in disassembled relation; and Fig. 4 is a perspective detail partly broken away of the high speed drive gear.

Referring first to Fig. 1 of the drawings, there is illustrated a driving motor 1 of conventional type comprising a casing 2 in which is journalled a drive shaft 3 extending axially therefrom. A gear housing 4 is mounted on the end of the motor casing by suitable means such as indicated at 5 and is provided with an axially extending bearing 6 in which is mounted a driven shaft 7 located substantially coaxial with the drive shaft 3. A pinion 8 or other suitable power take-off member is fixed on the extended end of the driven shaft 7 for the purpose of transmitting power therefrom to the apparatus, not illustrated, which it is desired to actuate.

According to the present invention, two trains of gearing are provided in the gear housing 4 for optionally connecting the drive shaft 3 to the driven shaft 7 at two different gear ratios. As here illustrated, the low gear train includes a pinion 9 mounted on the drive shaft 3 and fixed thereto in any suitable way as by means of a pin 11 traversing the drive shaft and the hub 12 of the pinion. A transmission member in the form of a low speed driven gear 13 is freely mounted on a smooth portion 14 of a lay shaft 15 journalled at its ends in the motor casing 2 and gear housing 4 in parallel relation beneath the driving shaft 3 and driven shaft 7 and is driven at low speed from driving shaft 3 through the low speed pinion 9 and transmission member 13. A pinion 16 is fixed on the lay shaft in any suitable manner as indicated at 17 and is arranged to mesh with a gear 18 keyed as indicated at 19 on the driven shaft 7.

Lay shaft 15 is driven at low speed from the driving shaft 3 through the low gear train comprising pinion 9 and transmission gear 13 by means of an overrunning clutch connection between gear 13 and shaft 15 comprising a clutch member in the form of a clamp nut 21 threaded on the lay shaft as shown at 22 and having a plane surface 23 arranged to frictionally engage and bind against the adjacent side of the transmission gear 13.

Means for controlling the action of the clamp nut 21 is provided in the form of a spring member 24 bearing frictionally on the periphery of said nut and non-rotatably connected in any suitable manner as indicated at 25 to the transmission gear member 13. The design of these parts, including the pitch and mean radius of the threaded connection 22 and the mean radii of the contacting surfaces of the nut and gear, is such that forward rotation of the transmission gear 13 causes the clutch member 21 to clamp said gear against a thrust washer 26 on the lay shaft 15 and thereby cause the gear to drive said shaft at low speed.

It will be understood that the engaging surfaces of the clutch member 21 and gear 13 may be roughened or serrated in any suitable manner in order to break down the oil film therebetween and/or render the clutch more positive in action if deemed desirable.

A high speed gear drive is provided between the drive shaft 3 and the lay shaft 15 including a drive gear 27 loosely mounted on the extended hub 28 of the drive pinion 9. The drive gear 27 is arranged to mesh with a driven pinion 29 keyed to the lay shaft 15 as indicated at 31. Pinion 29 is clamped against the thrust washer 26 which is seated against a shoulder 30 on the lay shaft, by means of a nut 32 threaded on said shaft. A lock washer 33 is preferably located between the nut 32 and gear 29 to prevent the nut from working loose.

Means subject to automatic or semi-automatic control for driving the high speed gear 27 from the drive pinion 9 is provided in the form of a friction clutch comprising discs 34 and 35 splined respectively to the hub of the pinion 9 and the interior of the gear 27. These clutch discs are arranged to be brought into frictional engagement by means of a control member in the form of a nut 36 threaded on the end of the driving pinion hub as indicated at 37 and arranged to clamp the discs against a thrust washer 38 bearing against a shoulder 39 formed on said pinion.

Means for controlling the clamping action of the clutch control nut 36 is provided in the form of a spring member 41 frictionally mounted on the periphery of said nut and normally rotatable therewith and having a terminal projection 42 extending radially in the plane of a detent member 43 slidably mounted in the gear housing 4. The detent 43 may be projected manually into the path of the projection 42 to arrest the rotation of the friction spring member 41, or may be actuated by a solenoid such as indicated at 44 which may be energized under manual or automatic control as desired.

The elements of the high speed clutch are so proportioned and arranged that when the friction spring member 41 is arrested in its movement by the detent 43, the retarding effect thereof will cause the control nut 36 to close the disc clutch and connect the drive gear 27 non-rotatably to the drive pinion 9 and consequently to the drive shaft 3. When the friction member 41 is released, however, the pressure of the control nut 36 against the clutch member is relaxed, and the gear 27 will be freed from the drive shaft 3. If desired, a dished spring member 45 may be interposed between the control nut 36 and the gear 27 in order to assist the relaxing motion of said nut.

It will be appreciated that inasmuch as the friction of the spring member 41 is a parasitic drag during high speed operation of the transmission, it is desirable to use as light pressure thereof as is consistent with reliable control of the transmission. One example of structure which has been found satisfactory in service comprises a thread of about one-half to three-quarters of an inch diameter and eighteen degrees to twenty degrees pitch, a friction surface of about one and one-quarter to one and one-half inches average diameter on the control nut, and a control torque of about two inch pounds.

In order to facilitate quiet operation of this gearing over long periods of use, the housing 4 is preferably arranged to be partly filled with a suitable lubricant. In order to retain this lubricant, the bearings for the lay shaft in the motor casing 2 and gear housing 4 are preferably sealed as indicated at 46 and 47 respectively.

In the operation of this device, when the motor 1 is energized while the detent 43 is in its retracted position as illustrated in Fig. 1, rotation of the drive shaft 3 is transmitted through pinion 9 to gear 13. Consequent rotation of the friction spring 24 causes the control nut 21 to clamp the gear 13 to the lay shaft 15, causing said lay shaft to rotate and operate the driven shaft 7 through pinion 16 and gear 18 whereby the pinion 8 is caused to drive the device to be operated at low speed.

When it is desired to operate the device at high speed, it is merely necessary to project the detent 43 into the path of the terminal 42 of the friction member 41. A retarding effect is thus imparted to the control nut 36 which consequently threads itself along the hub of pinion 9 into clamping engagement with the gear 27 and the high speed clutch elements whereby said gear is caused to rotate with the drive shaft 3, driving the lay shaft through the pinion 29 and thus causing the driven shaft 7 to be operated at high speed. When it is desired to return to low speed, it is merely necessary to release the detent 43, whereupon the high speed clutch is automatically released, freeing the gear 27 from the drive shaft 3.

During the high speed operation of this device, the control nut 21 of the low speed clutch is backed away from the gear 13 by the overrunning action of the lay shaft. When the high speed clutch is released, however, the low speed clutch will automatically reengage as previously described, and the low speed drive will be resumed.

One form of device for the operation of which this transmission is especially adapted is that type of domestic washing machine in which the washing operation is carried on at a low speed, after which the laundered material is partially dried by being centrifuged at high speed. By means of the present arrangement, it is merely necessary to start the washing operation by means of the normal low gear, and when the proper length of time has elapsed, to actuate the detent 43 either manually or by means of a time-controlled actuating mechanism, whereupon the high speed gearing is brought into operation to perform the drying function.

Although but one embodiment of the invention has been shown and described in detail, it will be understood that other embodiments are possible and various changes may be made in the design and arrangement of the parts without departing from the spirit of the invention as defined in the claims appended hereto.

What is claimed is:

1. In variable speed transmission gearing, a low speed gear train including a self-tightening friction clutch having driving and driven members, means actuated by the driving member for initiating the closing action of said clutch and causing said clutch members to separate when the driven member overruns the driving member thereof, a high speed gear train including a normally disengaged friction clutch having self-tightening servo action, and manually controlled means for controlling the frictional engagement of the high speed clutch.

2. In a variable speed transmission, a drive shaft, a pinion fixed thereon, a driven shaft, a gear loosely mounted thereon meshing with the drive pinion, an overrunning clutch connection between said gear and the driven shaft, a pinion fixed on the driven shaft, a gear meshing therewith, and a manually controlled clutch for connecting the last-mentioned gear to the drive shaft.

3. In a variable speed transmission, a drive shaft, a pinion fixed thereon, a driven shaft, a gear loosely mounted thereon meshing with the drive pinion, an overrunning clutch connection between said gear and the driven shaft, a pinion fixed on the driven shaft, a gear meshing therewith, a friction clutch for connecting the last-mentioned gear to the drive shaft, means normally rotatable with the drive shaft arranged upon retardation thereof to close the friction clutch, and manually controlled means for retarding said closing means.

4. In a variable speed transmission, a low speed gear train including an overrunning clutch, a high speed gear train including a normally disengaged self-tightening friction clutch having a rotary control member, a spring member bearing frictionally on said control member and normally rotating therewith, and manually operable means for arresting the rotation of the spring member.

5. In a variable speed transmission, a drive shaft, a pinion fixed thereon, a driven shaft, a gear loosely mounted thereon meshing with the drive pinion, means including a member threaded on the driven shaft for frictionally clamping the gear to said shaft, and frictional means connected with said gear for initiating the actuation of the clamping member.

6. In a variable speed transmission, a drive shaft, a pinion connected for rotation therewith, a high speed drive gear, a driven shaft, low and high speed driven gears thereon meshing with the pinion and drive gear respectively, clutch members having threaded connections with the driving and driven shafts, frictional control members bearing on said clutch members, and means for actuating said control members to cause the clutch members to alternatively connect the low speed driven gear to the driven shaft, and the high speed drive gear to the drive shaft.

7. In a variable speed transmission, a drive shaft, a pinion connected for rotation therewith, a high speed drive gear loosely mounted on the drive shaft, a driven shaft, a low speed driven gear loosely mounted thereon meshing with the pinion, a high speed driven gear fixed on the driven shaft meshing with the high speed drive gear, clutch members having threaded connections with the driving and driven shafts and arranged to engage the high speed drive gear and the low speed driven gear respectively, frictional control elements for said clutch members, and means for operating said control elements alternatively.

8. In a variable speed transmission, a drive shaft, a pinion fixed thereon, a driven shaft, a gear loosely mounted thereon meshing with the driven pinion, a clutch member threaded on the driven shaft for movement into and out of frictional engagement with the gear, and yielding means transmitting a light rotational drag from the gear to the clutch member, causing the clutch member to engage the gear upon rotation of the gear by the pinion.

THOMAS B. MARTIN.